United States Patent
Jheng et al.

(10) Patent No.: US 10,542,454 B2
(45) Date of Patent: Jan. 21, 2020

(54) CONTROL AND MANAGEMENT OF REFLECTIVE QOS

(71) Applicant: MEDIATEK INC., Hsinchu (TW)

(72) Inventors: Yu-Syuan Jheng, Hsinchu (TW); Pavan Nuggehalli, San Jose, CA (US); Guillaume Sebire, Oulu (FI); Chien-Chun Huang-Fu, Hsinchu (TW); Per Johan Mikael Johansson, Solaris (SG)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/892,501

(22) Filed: Feb. 9, 2018

(65) Prior Publication Data

US 2018/0234876 A1    Aug. 16, 2018

Related U.S. Application Data

(60) Provisional application No. 62/457,199, filed on Feb. 10, 2017.

(51) Int. Cl.
*H04W 28/02* (2009.01)
*H04L 12/851* (2013.01)
(Continued)

(52) U.S. Cl.
CPC ..... *H04W 28/0268* (2013.01); *H04L 47/2441* (2013.01); *H04L 67/146* (2013.01); *H04W 28/26* (2013.01); *H04L 47/20* (2013.01)

(58) Field of Classification Search
CPC ............................................. H04W 28/0268; H04W 28/26; H04L 67/146; H04L 47/2441; H04L 47/20
See application file for complete search history.

(56) References Cited

U.S. PATENT DOCUMENTS

| 7,870,231 B2 | 1/2011 | Mudireddy et al. |
| 2008/0019275 A1 | 1/2008 | Mudireddy et al. |
| (Continued) | | |

FOREIGN PATENT DOCUMENTS

| WO | WO 2008/011604 A2 | 1/2008 |
| WO | WO 2014/176987 A1 | 11/2014 |

OTHER PUBLICATIONS

U.S. Appl. No. 62/443,838—filed Jan. 9, 2017 (Year: 2017).*
(Continued)

*Primary Examiner* — Ian N Moore
*Assistant Examiner* — Rushil Parimal Sampat
(74) *Attorney, Agent, or Firm* — Oblon, McClelland, Maier & Neustadt, L.L.P.

(57) ABSTRACT

Aspects of the disclosure provide a method for reflective quality of service (QoS) control and management at a user equipment (UE). The method can include creating a derived QoS rule belonging to a session and having a QoS flow identifier (QFI). The derived QoS rule includes a precedence value that is set to one of a precedence value associated with a session identifier (ID) of the session received from a core network (CN) of a wireless communication system during a session establishment procedure for establishing the session, a precedence value associated with the QFI received from the CN during the session establishment procedure for establishing the session or when a downlink QoS flow having the QFI is added to the session, or a precedence value that is defined by an operator of the wireless communication system.

18 Claims, 5 Drawing Sheets

(51) Int. Cl.
*H04L 29/08* (2006.01)
*H04W 28/26* (2009.01)
*H04L 12/813* (2013.01)

(56) References Cited

U.S. PATENT DOCUMENTS

2017/0289046 A1* 10/2017 Faccin .................... H04L 47/20
2018/0376384 A1* 12/2018 Youn .................... H04W 36/00

OTHER PUBLICATIONS

International Search Report and Written Opinion dated Apr. 28, 2018 in PCT/CN2018/076262.
"3$^{rd}$ Generation Partnership Project; Technical Specification Group Services and System Aspects; System Architecture for the 5G System; Stage 2 (Release 15)", 3GPP TS 23.501, V2.0.0, Dec. 2017, 183 pages.
"Analysis of interim Agreements for QoS and PDU Session", 3GPP TSG-RAN WG3 Meeting #94, R3-162986, Nov. 2016, 9 pages.
"Summary of Email Discussion on QoS Framework", Intel, SA WG2 Meeting #116-BIS, S2-164759, Sep. 2016, 16 pages.
MediaTek Inc., "Precedence between RRC and reflective mapping", R2-1705521, 3GPP TSG-RAN WG2 Meeting #98, Hangzhou, China, May 15-19, 2017. http://www.3gpp.org/ftp/TSG_RAN/WG2_RL2/TSGR2_98/Docs/R2-1705521.Zip, Introduction, Option #1-Option #3.

* cited by examiner

| | QoS RULE ID | PRECEDENCE VALUE | PACKET FILTER | QFI |
|---|---|---|---|---|
| 321 | 1 | 1 | IP, *, RTP, *, UDP | 5 |
| 322 | 2 | 0 | IP, *, 73, 73, * | 65 |
| 323 | 3 | 2 | IP, *, GAME *, * | 103 |
| 324 | 4 | 5 | | 9 |

CONTROL AND MANAGEMENT OF REFLECTIVE QOS

INCORPORATION BY REFERENCE

This present disclosure claims the benefit of U.S. Provisional Application No. 62/457,199, "5G QoS Control" filed on Feb. 10, 2017, which is incorporated herein by reference in its entirety.

TECHNICAL FIELD

The present disclosure relates to wireless communications, and specifically relates to quality of service (QoS) management in a 3rd Generation Partnership Project (3GPP) 5th generation (5G) system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Quality of service (QoS) refers to traffic prioritization and resource reservation control mechanisms. QoS enables traffic classification and service differentiation such that different types of traffics or users may receive different services. QoS flow is the finest granularity for QoS management in a 5G wireless system.

SUMMARY

Aspects of the disclosure provide a method for reflective quality of service (QoS) control and management at a user equipment (UE). The method can include creating a derived QoS rule belonging to a session and having a QoS flow identifier (QFI). The derived QoS rule includes a precedence value that is set to one of a precedence value associated with a session identifier (ID) of the session received from a core network (CN) of a wireless communication system during a session establishment procedure for establishing the session, a precedence value associated with the QFI received from the CN during the session establishment procedure for establishing the session or when a downlink QoS flow having the QFI is added to the session, or a precedence value that is defined by an operator of the wireless communication system.

In one example, the method can further include receiving a message from the CN indicating the session ID of the session and a first reflective QoS (RQ) timer value. An RQ timer associated with the derived QoS rule is set to the first RQ timer value and started when a UE derived QoS rule is created. In one example, the method can further include receiving a message from the CN indicating the session ID of the session, a set of QFIs and a second RQ timer value that is different from the first RQ value. When a second UE derived QoS rule is created with one of the set of OFIs, a timer is set to the second RQ timer value.

In an embodiment, the method can further include receiving a message from the CN including the session ID of the session, and an operation code of modification or deletion, and modifying or deleting derived QoS rules of the session as a response to receiving the message.

In an embodiment, the method can further include receiving a message indicating whether the CN supports reflective QoS or not, and as a response to receiving the message, starting a monitoring operation for reflective QoS when the CN supports reflective QoS. In one example, the message is received from the CN, and specifies the session ID of the session, and/or the QFI. In one example, the message is received from an access network (AN) of the wireless communication system, and specifies the session ID of the session, the QFI, and/or a radio bearer ID.

In an embodiment, the method can further include receiving a message to indicate supporting or not supporting reflective QoS. Once not supporting Reflective QoS is received, the UE will stop monitoring the reflective QoS indication (RQI) carried in downlink packets. In one example, supporting of reflective QoS may be set as on by default at the CN, and the UE may transmit a session modification request to request the CN to stop supporting reflective QoS.

Aspects of the disclosure provide a UE for QoS control and management. The UE can include circuitry configured to create a derived QoS rule belonging to a session and having a QoS flow identifier (QFI). The precedence value of the derived QoS rule can be set to one of a precedence value associated with a session identifier (ID) of the session received from a core network (CN) of a wireless communication system during a session establishment procedure for establishing the session, a precedence value associated with the QFI received from the CN during the session establishment procedure for establishing the session or when a downlink QoS flow having the QFI is added to the session, or a precedence value that is defined by an operator of the wireless communication system.

Aspects of the disclosure provide a non-transitory computer-readable medium storing instructions that, when executed by one or more processors, cause the one or more processors to perform the method for reflective QoS control and management at a UE.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
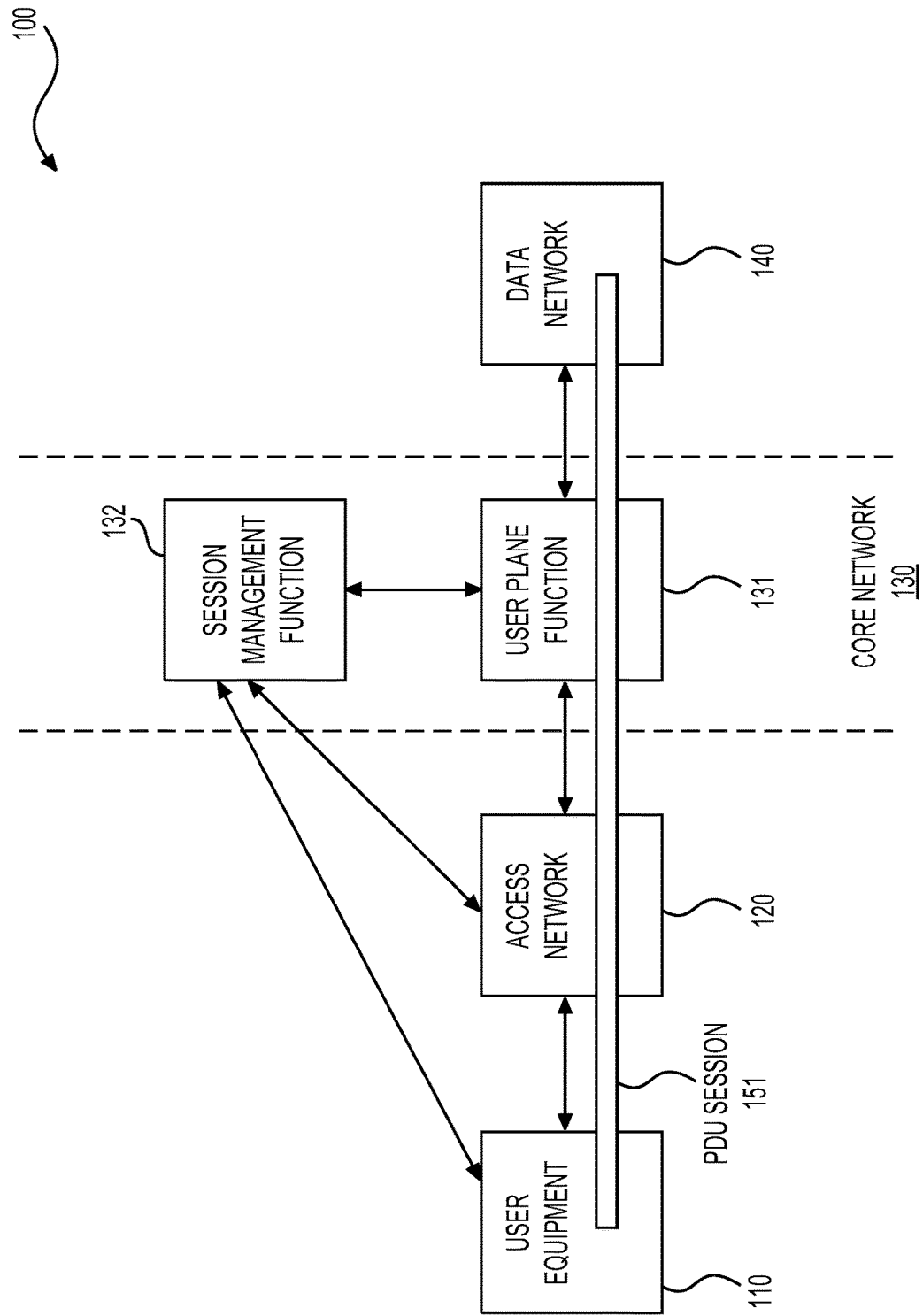
FIG. 1 shows an example wireless communication system according to an embodiment of the disclosure.

FIG. 1 shows an example wireless communication system 100 according to an embodiment of the disclosure. The system 100 can include user equipment (UE) 110, an access network (AN) 130, and a core network (CN) 130. Those components 110-130 are coupled together as shown in FIG. 1. In one example, the system 100 can be a system compliant with the 5th Generation (5G) system standards developed by 3rd Generation Partnership Project (3GPP). Accordingly, structure and functions of the system 100 can be similar to that defined by the 3GPP 5G system standards.

The UE 110 can be a mobile phone, a vehicle, a camera, a portable computer, and the like. The AN 120 can be a base station implementing radio access technologies specified by 3GPP New Radio standards or evolved Long Term Evolution (LTE) standards. Alternatively, the AN 120 can be a general base station implementing a non-3GPP access technology, such as Wi-Fi.

Figures 2, 3:
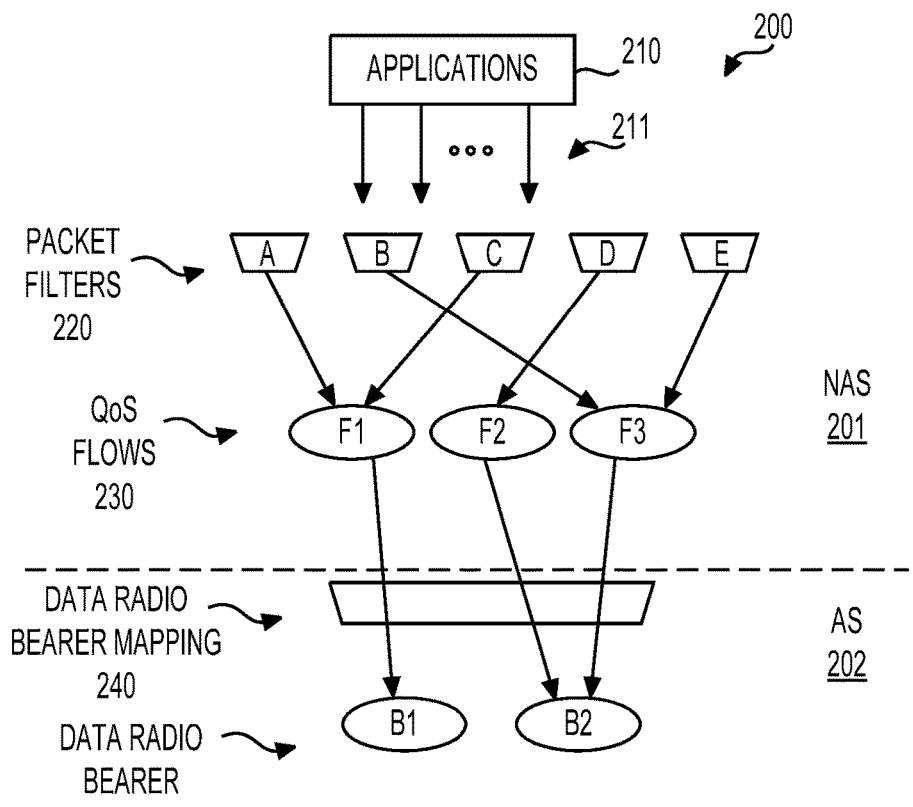
FIG. 2 shows an example packet mapping process according to an embodiment of the disclosure.
FIG. 3 shows an example mapping table according to an embodiment of the disclosure.

The CN 130 can include a plurality of functional elements, referred to as Network Functions (NFs). Each NF can be implemented either as a network element on a dedicated hardware, as a software instance running on a dedicated hardware, or as a virtualized function instantiated on an appropriate platform, such as a cloud infrastructure. Two NFs are shown in FIG. 2: a user plane function (UDF) 131, and a session management function (SMF) 132. The CN 130 can include other NFs although not shown in FIG. 1. The CN 130 can be separated into two parts: a user plane and a control plane. The user plane carries user traffic while the control plane carries signaling. The UPF 131 is in the user plane, and other NFs of the CN 130 are in the control plane.

The UPF 131 can include at least the following functionality: providing connection between the UE 110 and a data network (DN) 140 via the AN 120 for transmission of user plane traffic (downlink or uplink traffic); packet routing and forwarding; and quality of service (QoS) handling, such as uplink/downlink rate enforcement, reflective QoS marking in downlink, and the like. The DN 140 can be the Internet, or a third party wireless or wired network.

The SMF 132 is responsible for session management, such as establishment, modification, or release of a session. A session 151 is shown in FIG. 1. The session 151 is a logical connection between the UE 110 and the DN 140 crossing the AN 120 and the CN 130. A session is referred to as a protocol data unit (PDU) session in 3GPP standards. Similarly, a session is referred to as a PDU session in this disclosure. The PDU session 151 can be an IPv4 session, an IPv6 session, or an Ethernet session, and the like. The PDU session 151 can include packet flows, referred to as QoS flows. For example, uplink or downlink traffic in the PDU session 151 can be classified into different QoS flows each marked with a QoS flow identifier (QFI), for example, based on traffic types, user subscription information, and network configurations, or other factors. Different QoS flows can then be treated differently according to the OFIs when passing through the components of the system 100 along the PDU session 151.

The PDU session 151 can be established (upon request of the UE 110), modified (upon request of the UE 110 or the CN 130), and released (upon request of the UE 110 or the CN 130) using non-access stratum (NAS) session management signaling or messages exchanged between the UE 110 and the SMF 132. While the SMF 132 is shown to be directly connected with the UE 110 and the AN 120 in FIG. 1, messages between the SMF 132 and the UE 110 or the AN 120 can be transferred via other components of the system 100, such as an intermediate NF not shown in FIG. 1. Generally, due to structure of radio access network protocol stacks of an LTE or 5G system, messages between the UE 110 and components of the CN 130 (such as the SMF 132) are referred to as NAS messages, while messages between the UE 110 and the AN 120 are referred to access stratum (AS) messages. An AS message can be used as a carrier for delivery of a NAS message between the UE 110 and the CN 130.

In one example, the UE 110 can transmit a PDU session establishment request to initiate a PDU session establishment procedure. Alternatively, an application server in the DN 140 can send a request to the CN 130 that in response can send a trigger message to the UE 110 specifying a specific application in the UE 110. The UE 110 can pass the trigger message to the identified application in the UE 110. The identified application can then initiate a session establishment procedure. The PDU session establishment request may include a PDU session identifier (ID) and a destination DN, such as the DN 140. The PDU session ID can be unique per UE 110 and used to uniquely identify one of the UE 110's multiple PDU sessions.

In one example, during the session establishment procedure, the SMF 132 can be selected from multiple SMFs of the system 100. The SMF 132 can then select the UPF 131 for establishing the PDU session 151 from candidate UPFs. Subsequently, the SMF 132 can provide session context information to the UE 110, the AN 120, and the UPF 131, and allocate an IP address to the UE 110. Based on the session context information, the UE 110, the AN 120, and the UPF 131 can perform session related operations accordingly to support the PDU session 151.

In one example, QoS related context information can be provided by the SMF 132 to support QoS related operations at the UE 110, the AN 120, and the UPF 131. For example, one or more QoS profiles each corresponding to a QoS flow can be provided to the AN 120. One or more QoS rules can be provided to the UE 110. One or more packet filter sets can be provided to the UPF 131. Based on the QoS related context information, uplink or downlink traffic can be mapped to QoS flows, and processed accordingly. Specifically, the QoS rules provided to the UE 110 enable uplink QoS flow mapping at the UE 110. The filter sets provided to the UPF 131 enable downlink QoS flow mapping at the UPF 131.

In one example, the PDU session 151 can be modified after being established during a PDU session modification procedure. For example, a new QoS flow can be added by adding a QoS rule to the UE 110, or an existing QoS flow can be deleted by removing an existing QoS rule in the UE 110, when requested by the UE 110. One or more parameters related with the PDU session 151 or QoS flows of the PDU session 151 can be changed.

Particularly, in one example, during establishment or operation of the PDU session 151, a QoS feature, referred to as reflective QoS in 3GPP 5G system standards, can be enabled. For example, the SMF 132 can control the UPF 131 to associate a reflective QoS indication (RQI) with packets of a specific downlink QoS flow. The UE 110 can continuously monitor downlink traffic, and detect a packet carrying the RQI, and accordingly derive a QoS rule based on the detected packet. Then an uplink QoS flow corresponding to the downlink QoS flow can be identified and marked based on the derived QoS rule.

FIG. 2 shows an example packet mapping process 200 according to an embodiment of the disclosure. The process 200 can take place at the UE 110 in FIG. 1 after the session 151 and QoS flows of the session 151 are established. The process 200 can include two levels of mapping. With respect to user plane protocol stack at the UE 110, the first level mapping can be operated in non-access stratum (NAS) 201, while the second level mapping can be operated in access stratum (AS). Specifically, the AS mapping operation can be performed by a service data adaptation protocol (SDAP) layer. SDAP is a new user plane protocol added to AS as specified in 3GPP 5G system standards.

During the first level NAS mapping, uplink traffic is mapped to QoS flows. As shown, traffic 211 (such as IP packets or Ethernet packets, depending on a session type), is generated from applications 210. Then, packet filters 220 A-E are employed to classify packets of the traffic 211 into QoS flows 230 F1-F3. The packet filters 220 can be specified in a group of QoS rules, for example, provided by the SMF 132 when the session 151 is established. Each of the QoS packet flows 230 can be associated with a QFI according to the QoS rules. Thus, after the classification, each packet is associated with a QFI, which is referred to as a marking operation. The QFI can be referred to as a marker. Carrying a marker, a packet can be treated accordingly to receive a certain level of service corresponding to the marker.

During the second level AS mapping, the QoS flows 230 are further mapped to data radio bearers 250 B1-B2. For example, the SDAP layer can perform a data radio bearer mapping 240 to map each packet to a data radio bearer 250. Each data radio bearer 250 is a logical connection between the UE 110 and the AN 120. Different data radio bearers can receive differentiated radio transmission services. In addition, the SDAP layer may encapsulate a packet with an SDAP header. The QFI associated with this IP packet can be carried in this SDAP header.

FIG. 3 shows an example mapping table 300 according to an embodiment of the disclosure. The mapping table 300 can be stored in the UE 110, and used to perform the NAS mapping in FIG. 2 example. The mapping table 300 includes a set of QoS rules each included in a row 321-324 of the mapping table 300. Each QoS rule includes a set of parameters listed in each column 311-314 of the table 300. The set of parameters can be a QoS rule ID which is unique within a PDU session, a precedence value, a set of packet filters for identify an associated QoS flow, a QFI of the associated QoS flow. The QoS rule with ID of 4 is a default QoS rule and does not include a packet filter in FIG. 3 example. In FIG. 3 example, the mapping table 300 is associated with a PDU session of IP type. Thus, the set of packet filters in column 313 are created using 5 tuples of IP packets. In various examples, packets of different types of PDU sessions may have different packet formats. Accordingly, packet filters can be created in different ways.

The QoS rule precedence value determines an order in which a QoS rule is evaluated. For example, during the NAS mapping, the UE 110 evaluates the uplink packets against the packet filters included in the mapping table 300 based on the precedence values in increasing order until a matching QoS rule is found. For example, the QoS rules with IDs of 1-4 and precedence values of 1, 0, 2, 5, respectively will be evaluated in the following order (represented with the QoS rule IDs): 2, 1, 3, and 4. The default QoS rule does not have a packet filter and is evaluated as the last one. When no matching QoS rule is found for a packet and the default QoS rule includes a packet filter, the packet is discarded.

In one example, the QoS rules in the mapping table 300 can be explicitly provided to the UE 110, for example, using a PDU session establishment or modification procedure. In another example, the QoS rules can be preconfigured in the UE 110. In a further example, the QoS rules can be implicitly derived by the UE 110 by applying reflective QoS.

Figure 4:
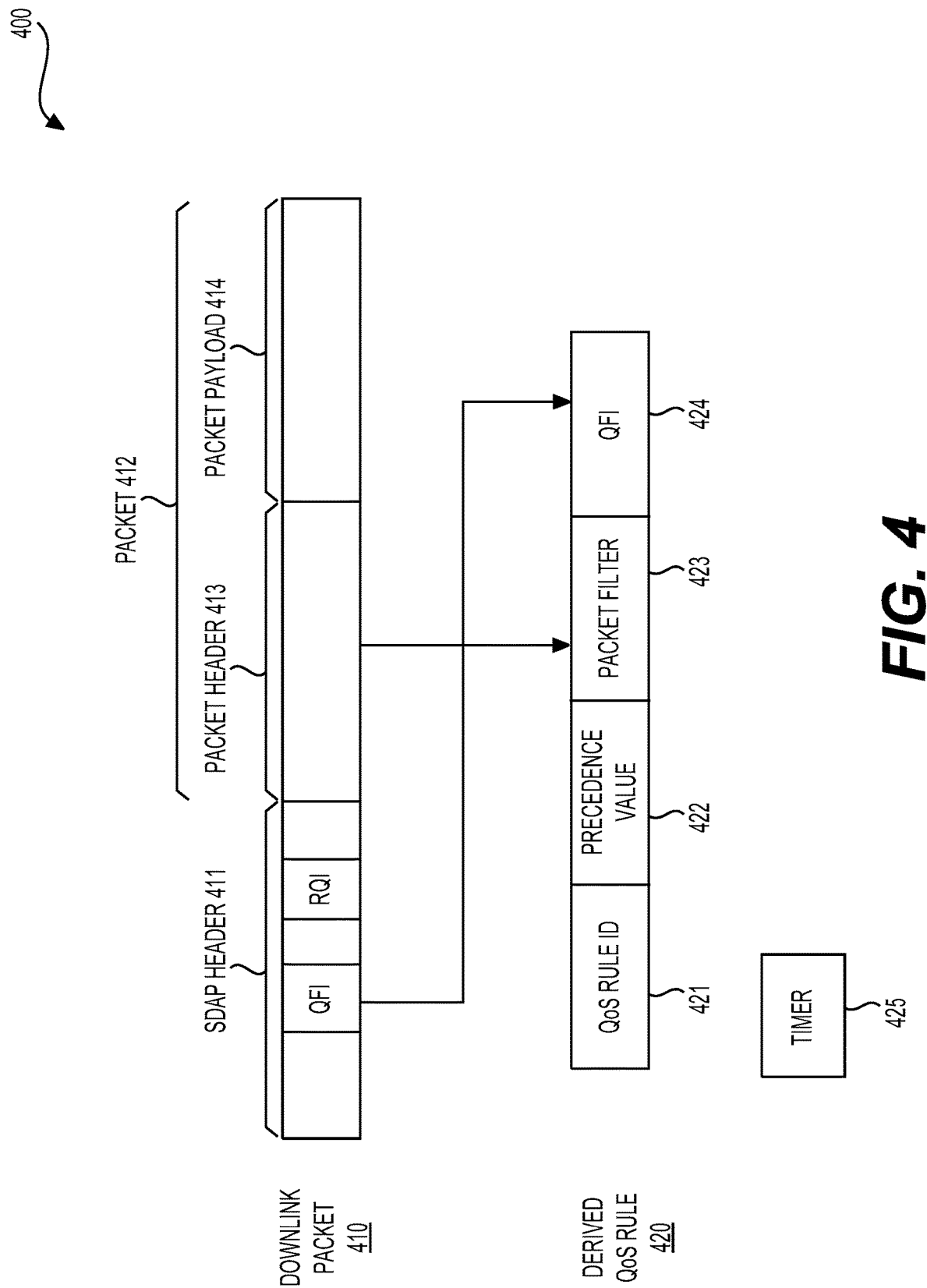
FIG. 4 shows an example process for creating a derived quality of service (QoS) rule based on downlink traffic according to an embodiment of the disclosure.

FIG. 4 shows an example process 400 for creating a derived QoS rule based on downlink traffic according to an embodiment of the disclosure. Reflective QoS enables the UE 110 to create derived QoS rules for mapping uplink traffic to QoS flows without the SMF 132 providing QoS rules. In this way, signaling cost for providing QoS rules to the UE 110 can be saved. When the CN 130 determines to use reflective QoS for a QoS flow, the SMF 132 can control the UPF 131 to mark RQIs on downlink packets of this QoS flow. The UE 110 can monitor downlink traffic to detect packets that carry the RQIs, and accordingly create derived QoS rules based on detected packets. When the CN 130 determines to stop using reflective QoS for this QoS flow, the SMF 132 can control the UPF 130 to stop marking of the RQIs.

In FIG. 4, a downlink packet 410 includes a SDAP header 411 and a packet 412 (such as an IP packet or Ethernet packet). The packet 412 can include a packet header 413 and a packet payload 414. The SDAP header 411 carries a QFI indicating a QoS flow to which the packet 412 belongs. The SDAP header 411 also carries an RQI indicating reflective QoS is enabled for uplink traffic corresponding to the downlink QoS flow to which the packet 412 belongs.

The UE 110 can inspect the SAP header 411 to detect the RQI while monitoring downlink traffic, and create a derived QoS rule 420 based on the downlink packet 410. The derived QoS rule 420 can include a QoS rule ID 421, a precedence value 422, a packet filter 423, and a QFI 424. The QFI 424 can be set to the QFI carried in the SDAP header 411. The packet filter 423 can be created based, for example, 5 tuples carried in the packet header 413. In addition, a timer 425 can be associated with the derived QoS rule 420, and triggered. The timer 425 can be initiated with a reflective QoS (RQ) timer value that is provided from the CN 130, such as the SMF 132. Alternatively, the timer 425 can be set to a default RQ timer value.

In one example, when the downlink packet 410 is detected to carry the RQI, the UE 110 can first create the packet filter 423, and search existing QoS rules in the UE 110 to see if a QoS rule having the packet filter 423 has been created already. If not, the UE 110 can create the derived QoS rule 420 in the above described way. If the derived QoS rule 420 has been created before, the UE 110 can restart the timer 425. In addition, if the RQI carried in the downlink packet 410 is different from that of the previously created QoS rule, the RQI of the previously created QoS rule will be updated. When the timer 425 expires, the derived QoS rule 420 is removed.

The precedence value 422 can be provided in different ways in various examples. In a first example, a reflective QoS precedence value for a PDU session is provided when the PDU session is established. For example, the SMF 132 transmits a message during a session establishment procedure indicating a precedence value for this session. For example, the indicated precedence value is associated with a session ID of the PDU session and can be used for each derived QoS rule of this PDU session.

In a second example, a reflective QoS precedence value is provided for a downlink QoS flow when the downlink QoS flow is established. For example, the SMF 132 can transmit a message indicating a precedence value for a downlink QoS flow when the respective downlink QoS flow is established. The precedence value can be associated with a QFI, and used for a derived QoS rule including the QFI. A downlink QoS flow can be established during a PDU session establishment procedure, or be added to the established PDU session later during a PDU session modification procedure. Alternatively, in the above first and second examples, the reflective QoS precedence value can be provided when reflective QoS is enabled by the SMF 132.

In a further example, an operator defined value can be used as the precedence value 422 for a PDU session or a QoS flow. For example, the operator defined precedence value can be stored in a subscriber identity module (SIM), or storage of the UE 110, and extracted when needed. Alternatively, the operator defined precedence value can be provided from the AN 120, for example, by radio resource control (RRC) signaling, medium access control (MAC) layer signaling, broadcasted system information, and the like. The operator defined value can be provided from the AN 120 when the respective PDU session or the QoS flow is established, or when reflective QoS is enabled.

Derived QoS rules can be modified (e.g., changing a precedence value or QFI) or removed once the derived QoS rules are not needed. In various examples, there are different control schemes to realize modification or deletion of derived QoS rules.

A first scheme is by using a timer initiated with an RQ timer value and associated with a respective QoS rule, as described above. When no RQI is detected for a QoS flow for a time period equal to the RQ timer value, the timer expires, and the respective QoS rule can be removed. In one example, an RQ timer value for a PDU session can be provided to the UE 110 when the PDU session is established or when reflective QoS is enabled for the PDU session. For example, the SMF 132 can transmit a message indicating the RQ timer value (a life time of derived QoS rules) and an associated PDU session ID. Accordingly, a derived QoS rule of the PDU session can use the RQ timer value to set a timer or update the timer. In addition, in one example, the SMF 132 can transmit a message indicating a new RQ timer value for the PDU session to replace the previous RQ timer value while the PDU session being maintained.

A second scheme is by transmitting a dedicated message, for example, from the SMF 132 to modify or remove derived QoS rules of a PDU session. For example, the SMF 132 can transmit a message to the UE 110 indicating a session ID of the PDU session, and an operation code of modification or deletion. The UE 110 can receive the message, and accordingly modify or delete the derived QoS rules of the PDU session. For example, for modification, the UE 110 can update precedence values and/or QFIs of the derived QoS rules. Alternatively, the SMF 132 can transmit a message to the UE 110 indicating the session ID, a set of QFIs, and an operation code of modification or deletion. Accordingly, the UE 110 can perform modification or deletion on derived QoS rules corresponding to the indicated QFIs.

A third scheme is that the UE 110 can request the SMF 132 to remove existing derived QoS rules of a PDU session. For example, the UE 110 can transmit a session modification message to the SMF 132. The message can indicate a session ID of the PDU session, thus the SMF 132 can disable reflective QoS for QoS flows corresponding to the existing derived QoS rules, for example, stopping to insert RQI to downlink packets of those QoS flows. Alternatively, the message can specify the session ID and a set of QFIs corresponding to a set of derived QoS rules. As a result, the SMF 132 can disable reflective QoS for QoS flows corresponding to the specified set of QFIs. Subsequently, respective existing derived QoS rules can be removed when associated timers expires. Alternatively, the SMF 132 may reply with a message to accept the request. The UE 110 can remove the respective existing derived QoS rules after receiving the accept message even associated timers do not expire.

As described above, reflective QoS is controlled on per-packet basis by associating an RQI with a packet. The UE 110 continuously monitors each downlink packet of the respective PDU session in order to detect a packet marked with an RQI, which is a burden for the UE 110. To release the UE 110 from the burden, a message can be transmitted to the UE 110 to start or stop the monitoring operation for reflective QoS, according to aspects of the disclosure.

For example, when the SMF 132 is going to enable reflective QoS, the SMF 132 can transmit a message informing the UE 110 to start the monitoring operation. The message may specify one or more PDU session IDs, and/or one or more QFIs corresponding to respective PDU session IDs. The UE 110 receives the message and accordingly starts to monitor traffic corresponding to specified PDU sessions, or QoS flows. When the SMF 132 disables previously enabled reflective QoS of a session, or a QoS flow, the SMF 132 can transmit a message to the UE 110 indicating the respective session, or QoS flow. The UE 110 may accordingly stop respective monitoring operations.

In alternative examples, the message for starting or stopping the monitoring operation for reflective QoS can be transmitted from the AN 120. For example, the SMF 132 may inform the AN 120 about the enabling or disabling of reflective QoS in order to control QoS operations performed at the AN 120. The AN 120 can subsequently inform the UE 110 the start or end of reflective QoS. The message from the AN 120 can similarly specify which PDU sessions, QoS flows, and/or radio bearers are going to be enabled or disabled with reflective QoS. The message from the AN 120 can be in the form of RRC signaling, packet data convergence protocol (PDCP) control data unit, system information, broadcast information, and the like.

An alternative scheme for controlling the reflective QoS monitoring operations is that the SMF 132 can transmit a message indicating whether the CN 130 supports reflective QoS or not. For example, the CN 130 may be configured not to support reflective QoS, or the CN 130 determines not to support reflective QoS for certain PDU sessions. The message indicating whether the CN 130 supports reflective QoS or not can be transmitted to the UE 110 when a session is established. Alternatively, the message can be transmitted to the UE 110 in advance of establishment of a session, for example, when the UE 110 is connected to the CN 130.

In one example, the UE 110 can be configured by default to start to perform reflective QoS monitoring for detection of an RQI in downlink packets when a PDU session is established. When the UE 110 receives a message from the CN 130 indicating the CN 130 does not support reflective QoS, the UE 110 can stop the monitoring operation. In one example, the UE 110 does not start a reflective QoS monitoring when a PDU session is established. When the UE 110 receives a message from the CN 130 indicating the CN 130 supports reflective QoS for the respective PDU session, the UE 110 can start to perform reflective QoS monitoring for the respective PDU session. Later, when the UE 110 receives a message from the CN 130 indicating the CN 130 does not support reflective QoS for the PDU session anymore, the UE 110 can stop the reflective QoS monitoring for the PDU session.

In a further scheme for controlling the reflective QoS monitoring operations, the UE 110 can initiate to request the CN 130 to stop supporting reflective QoS for one or more PDU sessions. For example, the UE 110 can transmit a PDU session modification message specifying a set of PDU session IDs for stopping reflective QoS support. Alternatively, the UE 110 can transmit a PDU session modification message indicating stopping reflective QoS support for all sessions. The SMF 132 may reply a message to accept the request of the UE 110. Upon receiving the accept message, the UE 110 can stop reflective QoS monitoring operations for respective PDU sessions or all PDU sessions.

Figure 5:
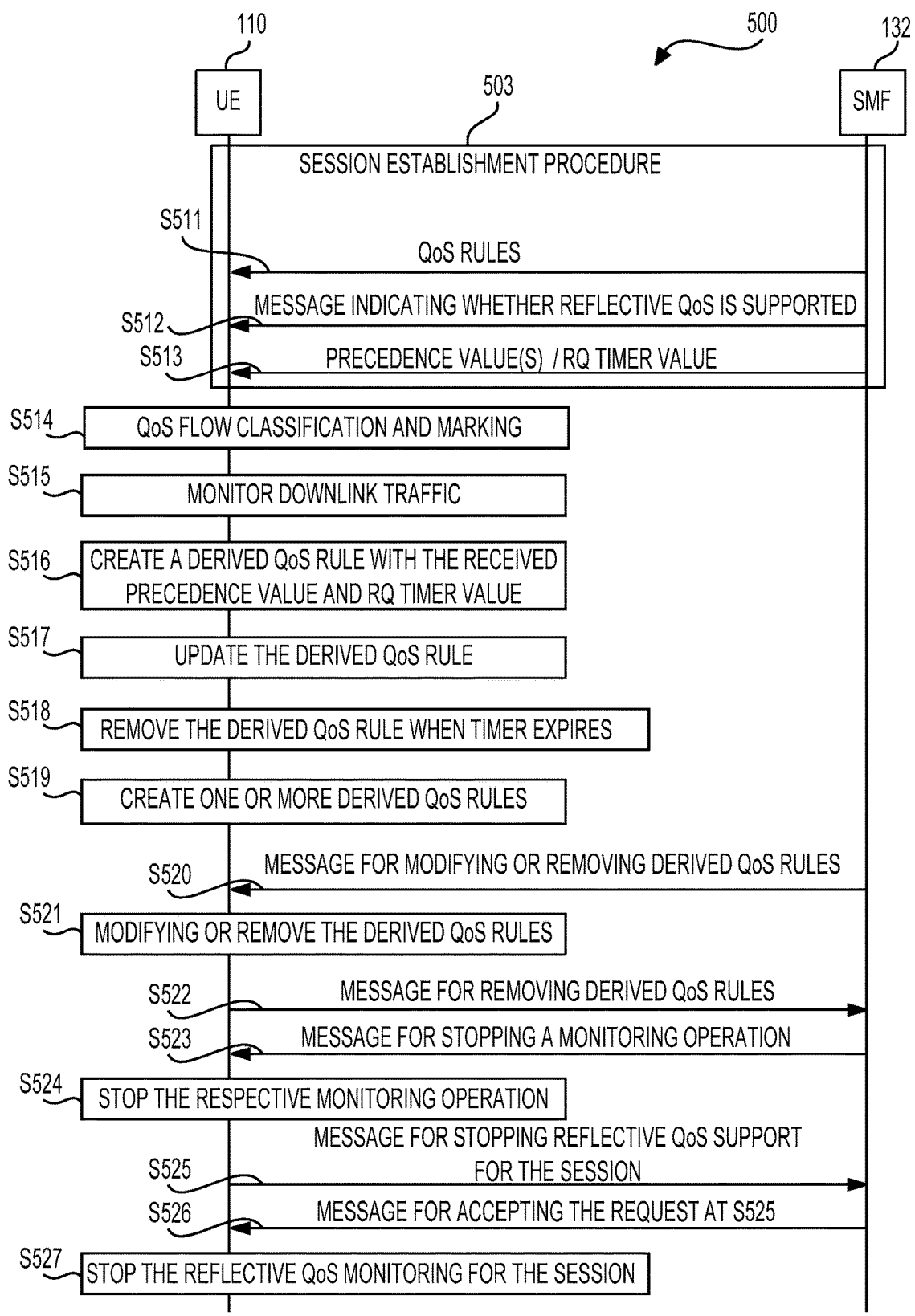
FIG. 5 shows a flowchart of an example reflective QoS control and management process according to some embodiments of the disclosure.

FIG. 5 shows a flowchart of an example reflective QoS control and management process 500 according to some embodiments of the disclosure. During the process 500, messages are transmitted between the SFM 132 and the UE 110.

At S511, the UE 110 receives QoS rules for uplink traffic classification and marking. S511 can be part of a PDU session establishment procedure 503 for establishment of a PDU session.

At S512, the UE 110 receives a message indicating whether reflective QoS is supported for the session by the CN 130. If reflective QoS is not supported for the session, the UE 110 will not start reflective QoS monitoring. If the UE 110 is configured to start reflective QoS monitoring by default when the session is established, the UE 110 will stop the default monitoring upon receiving the message. If reflective QoS is supported for the session, the UE 110 will start to monitor downlink traffic of the session as indicated at S515.

At S513, the UE 110 receives precedence values(s) for reflective QoS. The precedence value can be assigned for this PDU session. Thus, reflective QoS rules of the PDU session can use the precedence value when created. Alternatively, the precedence values can be assigned for QoS flows and are associated with QFIs of the QoS flows. When a reflective QoS rule including one of the QFIs is created, a respective precedence value is used. In other examples, a precedence value defined for a QoS flow can be provided by the SMF 132 when the QoS flow is added to an existing PDU session during a PDU session modification procedure.

Also at S513, the UE 110 receives an RQ timer value for the session established during the session establishment procedure 503. For example, the CN 130 supports reflective QoS, and subsequently transmits a message including the RQ timer value. Similarly, S512 and S513 can be performed during the session establishment procedure 503.

AS514, the UE 110 performs classification and marking based on the received QoS rules to map uplink traffic to respective QoS flows.

At 515, the UE 110 continuously monitors downlink traffic of the PDU session or QoS flows indicated at S514 to detect packets carrying an RQI.

At S516, the UE 110 creates a derived QoS rule as a result of detecting a downlink packet carrying an RQI, and starts a timer associated with the derived QoS rule. The precedence value received at S511 can be set as the precedence of the derived QoS rule, and the RQ timer value received at S513 can be set as the initial value of the timer.

At S517, the UE 110 can update the derived QoS rules when another downlink packet carrying the same RQI is detected. The timer can be restarted.

At S518, the UE 110 can remove the derived QoS rules when the timer expires.

At S519, the UE 110 can create one or more derived QoS rules after detecting downlink packets carrying RQIs.

At S520, the UE 110 can receive a message for modifying or removing the one or more derived QoS rules created at S519. For example, the message may specify the PDU session ID, and an operation code of modification or deletion.

At S521, the UE 110 can modify or remove the one or more derived QoS rules based on the message received at S520.

At S522, the UE 110 can initiate to transmit a message for removing derived QoS rules. For example, after S521, one or more derived QoS rules are created. The UE 110 can specify the PDU session ID of the session, or the PDU session ID of the session and a set of QFIs in the message. By receiving the message, the SMF 132 can stop RQI insertion operations performed on packets of the session, or packets of QoS flows corresponding to the specified QFIs. Additionally, the SMF 132 can reply an accept message. The UE 110 can remove the respective derived QoS rules upon receiving the accept message.

At 523, the UE 110 can receive a message for stopping a monitoring operation performed on a QoS flow. For example, the message can specify a PDU session ID of the PDU session and a QFI of the QoS flow.

At S524, the UE 110 can stop the respective monitoring operation according to the message received at S522.

At S525, the UE 110 can initiate to transmit a message for stopping reflective QoS support for the session established during the session establishment procedure 503. Upon receiving the message, the CN 130 may stop reflective QoS operations for the session accordingly.

At S526, the UE 110 can receive a message from the CN 130 accepting the request at S525.

At S527, the UE 110 can stop the reflective QoS monitoring for the session. The process 500 can then terminated.

Figure 6:
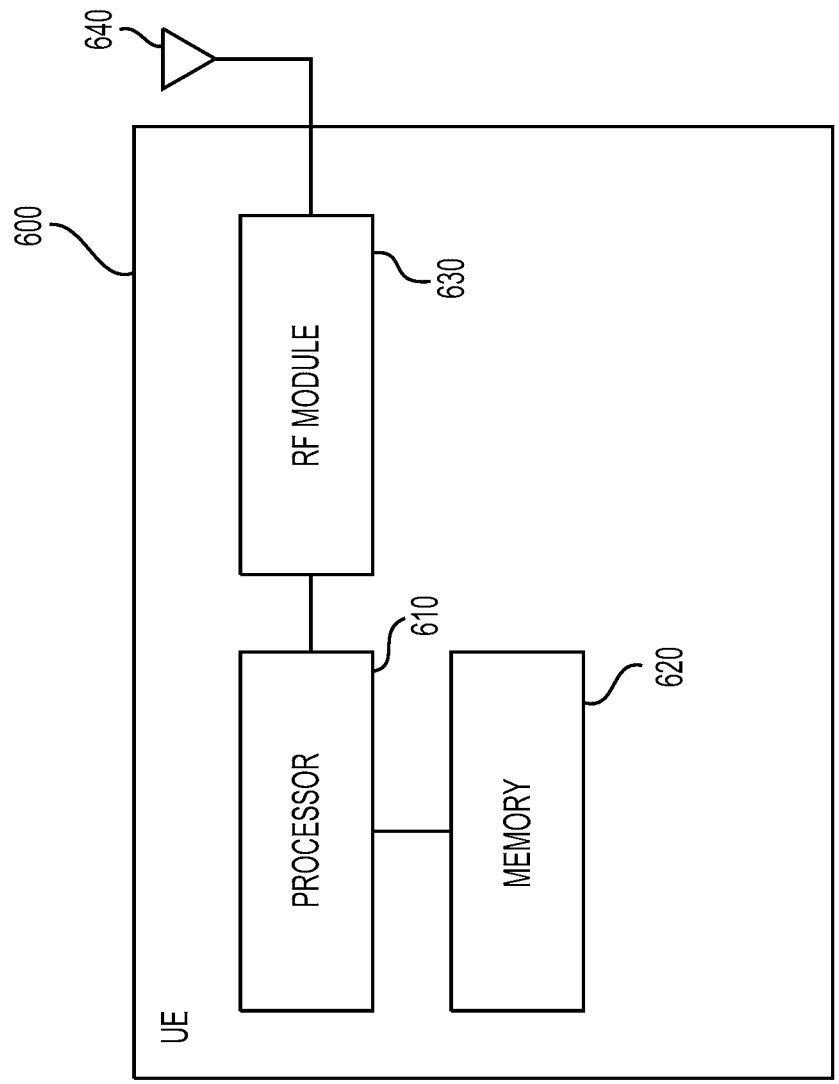
FIG. 6 shows an exemplary block diagram of a user equipment (UE) according to an embodiment of the disclosure.

FIG. 6 shows an exemplary block diagram of a UE 600 according to an embodiment of the disclosure. The UE 600 can be configured to implement various embodiments of the disclosure described herein. The UE 600 can include a processor 610, a memory 620, and a radio frequency (RF) module 630 that are coupled together as shown in FIG. 6. In different examples, the UE 600 can be a mobile phone, a tablet computer, a desktop computer, a vehicle carried device, and the like.

The processor 610 can be configured to perform various functions of the UE 110 as described above with reference to FIGS. 1-5. The processor 610 can include signal processing circuitry operating according to communication protocols specified in, for example, 3GPP LTE and 5G system standards. Additionally, the processor 610 may execute program instructions, for example, stored in the memory 620, to perform functions related with different communication protocols. The processor 610 can be implemented with suitable hardware, software, or a combination thereof. For example, the processor 610 can be implemented with application specific integrated circuits (ASIC), field programmable gate arrays (FPGA), and the like, that includes circuitry. The circuitry can be configured to perform various functions of the processor 610.

In one example, the memory 620 can store program instructions that, when executed by the processor 610, cause the processor 610 to perform various functions as described herein. The memory 620 can include a read only memory (ROM), a random access memory (RAM), a flash memory, a solid state memory, a hard disk drive, and the like.

The RF module 630 can be configured to receive a digital signal from the processor 610 and accordingly transmit a signal to a base station in a wireless communication network via an antenna 640. In addition, the RF module 630 can be configured to receive a wireless signal from a base station and accordingly generate a digital signal which is provided to the processor 610. The RF module 630 can include digital to analog/analog to digital converters (DAC/ADC), frequency down/up converters, filters, and amplifiers for reception and transmission operations. For example, the RF module 630 can include converter circuits, filter circuits, amplification circuits, and the like, for processing signals on different carriers or bandwidth parts.

The UE 600 can optionally include other components, such as input and output devices, additional CPU or signal processing circuitry, and the like. Accordingly, the UE 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for reflective quality of service (QoS) control and management at a user equipment (UE), comprising:
receiving, by the UE, a downlink packet in a session, the downlink packet including a QoS flow identifier (QFI);
deriving, by the UE, a first QoS rule according to information included in the downlink packet, the first QoS rule derived by the UE being for the session and having the QFI;
setting a precedence value of the first QoS rule derived by the UE to
a precedence value associated with a session identifier (ID) of the session received from a core network (CN) of a wireless communication system during a session establishment procedure for establishing the session, or
a precedence value that is defined by an operator of the wireless communication system;
receiving a message from the CN indicating the session ID of the session and a first reflective QoS (RQ) timer value; and
starting a timer associated with the first QoS rule, the timer set to the first RQ timer value,
wherein the precedence value corresponds to an order for evaluating the first QoS rule derived by the UE for transmitting an uplink packet in the session when at least one other QoS rule for the session is available.

2. The method of claim 1, further comprising:
receiving a message from the CN indicating the session ID of the session and a second RQ timer value that is different from the first RQ timer value; and
deriving, by the UE, a second QoS rule associated with a timer set to the second RQ timer value.

3. The method of claim 1, further comprising:
receiving a message from the CN including the session ID of the session, and an operation code of modification or deletion; and
modifying or deleting the first QoS rule derived by the UE for the session as a response to receiving the message.

4. The method of claim 1, further comprising:
transmitting a message to the CN including (a) the session ID of the session, or the session ID of the session and a set of QFIs of derived QoS rules that are derived by the UE, and (b) an operation code of deletion.

5. The method of claim 1, further comprising:
receiving a message indicating whether the CN supports reflective QoS or not; and
as a response to receiving the message indicating the CN supports the reflective QoS, starting, by the UE, a monitoring operation for detecting a downlink packet carrying a reflective QoS indication (RQI).

6. The method of claim 5, the method further comprising:
receiving a message indicating the CN does not support the reflective QoS anymore; and
as a response to receiving the message indicating the CN does not support the reflective QoS anymore, stopping, by the UE, the monitoring operation for detecting the downlink packet carrying the RQI.

7. The method of claim 1, further comprising:
receiving a message for stopping a monitoring operation for detecting a downlink packet carrying a reflective QoS indication (RQI); and
as a response to receiving the message for stopping the monitoring operation for detecting the downlink packet carrying the RQI, stopping, by the UE, the monitoring operation for detecting the downlink packet carrying the RQI.

8. The method of claim 7, wherein the message is received from the CN, and the message specifies the session ID of the session or the QFI.

9. The method of claim 7, wherein the message is received from an access network (AN) of the wireless communication system, and the message specifies the session ID of the session, the QFI, or a radio bearer ID.

10. The method of claim 1, further comprising:
transmitting a message requesting the CN to stop reflective QoS support for the session.

11. A user equipment (UE) for reflective quality of service (QoS) control and management, the UE comprising:
circuitry configured to:
receive a downlink packet in a session, the downlink packet including a QoS flow identifier (QFI);

derive a first QoS rule according to information included in the downlink packet, the first QoS rule derived by the UE being for the session and having the QFI;

set a precedence value of the first QoS rule derived by the UE to a precedence value associated with a session identifier (ID) of the session received from a core network (CN) of a wireless communication system during a session establishment procedure for establishing the session, or a precedence value that is defined by an operator of the wireless communication system;

receiving a message from the CN indicating the session ID of the session and a first reflective QoS (RQ) timer value; and starting a timer associated with the first QoS rule, the timer set to the first RQ timer value, wherein the precedence value corresponds to an order for evaluating the first QoS rule derived by the UE for transmitting an uplink packet in the session when at least one other QoS rule for the session is available.

12. The UE of claim 11, wherein the circuitry is further configured to:

receive a message from the CN including the session ID of the session, and an operation code of modification or deletion; and modify or delete the first QoS rule derived by the UE for the session as a response to receiving the message.

13. The UE of claim 11, wherein the circuitry is further configured to:

transmit a message to the CN including (a) the session ID of the session, or the session ID of the session and a set of OFIs of derived QoS rules that are derived by the UE, and (b) an operation code of deletion.

14. The UE of claim 11, wherein the circuitry is further configured to:

receive a message indicating whether the CN supports reflective QoS or not; and as a response to receiving the message indicating the CN supports the reflective QoS, start a monitoring operation for detecting a downlink packet carrying a reflective QoS indication (RQI).

15. The UE of claim 14, wherein the circuitry is further configured to:

receive a message indicating the CN does not support the reflective QoS anymore; and as a response to receiving the message indicating the CN does not support the reflective QoS anymore, stop the monitoring operation for detecting the downlink packet carrying the RQI.

16. The UE of claim 11, wherein the circuitry is further configured to:

receive a message for stopping a monitoring operation for detecting a downlink packet carrying a reflective QoS indication (RQI); and as a response to receiving the message for stopping the monitoring operation for detecting the downlink packet carrying the RQI, stop the monitoring operation for detecting the downlink packet carrying the RQI.

17. The UE of claim 11, wherein the circuitry is further configured to:

transmit a message requesting the CN to stop reflective QoS support for the session.

18. A non-transitory computer-readable medium storing instructions for reflective quality of service (QoS) control and management at a user equipment (UE), that, when executed by one or more processors of the UE, cause the one or more processors of the UE to perform a method, the method comprising:

receiving a downlink packet in a session, the downlink packet including a QoS flow identifier (QFI);

deriving a first QoS rule according to information included in the downlink packet, the first QoS rule derived by the UE being for the session and having the QFI;

setting a precedence value of the first QoS rule derived by the UE to a precedence value associated with a session identifier (ID) of the session received from a core network (CN) of a wireless communication system during a session establishment procedure for establishing the session, or a precedence value that is defined by an operator of the wireless communication system;

receiving a message from the CN indicating the session ID of the session and a first reflective QoS (RQ) timer value; and starting a timer associated with the first QoS rule, the timer set to the first RQ timer value, wherein the precedence value corresponds to an order for evaluating the first QoS rule derived by the UE for transmitting an uplink packet in the session when at least one other QoS rule for the session is available.

* * * * *